United States Patent

[11] 3,585,630

[72] Inventors Piero Pomella;
    Elia Baratto, both of Torino, Italy
[21] Appl. No. 759,895
[22] Filed Sept. 16, 1968
[45] Patented June 15, 1971
[73] Assignee Inq. Co. Olivetti & Co. S.p.A.
    Ivrea, Italy
[32] Priority Sept. 16, 1967
[33] Italy
[31] 53045

[54] DIGITAL POSITION MEASURING DEVICES
    2 Claims, 2 Drawing Figs.
[52] U.S. Cl..................................................... 340/347,
                                    235/151.11, 235/154
[51] Int. Cl....................................................... H03k 13/02
[50] Field of Search.......................................... 340/347;
                                    235/154, 92, 151.11; 318/20

[56] References Cited
    UNITED STATES PATENTS
2,947,929  8/1960  Bower .......................... 340/347X
3,078,400  2/1963  Kilroy et al. .................. 340/347X
3,227,863  1/1966  Winsor ......................... 340/247X
3,473,098  10/1969  Waller ........................ 318/20X Primary Examiner—Maynard R. Wilbur
Assistant Examiner—Charles D. Miller
Attorney—Beckett, Birch, Swindler & McKie ABSTRACT: A digital position measuring device for measuring the displacement of a member movable with respect to a fixed member along an axis provided with a series of zero positions successively and equally displaced from one another to form steps. A first counter and means for converting its digital contents which are representative of the relative position of the movable member within each of the steps into an analog signal are provided. A position detector is responsive to the analog signal and to the existing position of the movable member to supply a signal which controls the transmission of counting pulses to the first counter and to a second counter. The latter is adapted to count concurrently with the first counter and is connected to a device for displaying its contents. The digital contents of the first and second counters are initially reset to zero such that subsequent operation of the two counters enables a visual digital form of the relative position of the movable member within the limits of one of said steps to be produced by the display device.

PATENTED JUN 15 1971

3,585,630

INVENTORS
PIERO POMELLA
ELIA BARATTO

Irons, Birch, Swindler & McKie
ATTORNEYS

DIGITAL POSITION MEASURING DEVICES

CROSS-REFERENCE TO RELATED APPLICATIONS

Applicants claim priority from Italian Pat. application No. 53045-A/67, filed Sept. 16, 1967. This application relates to improvements in devices described in copending U.S. Pat. application Ser. Nos. 493,336 and 630,432, assigned to the same assignee as this application.

BACKGROUND OF THE INVENTION

1. Field of the Invention

The invention relates to a digital position measuring device for measuring the displacement of a member movable with respect to a fixed member along an axis.

2. Description of the Prior Art

The digital position measuring device for measuring the displacement of a movable member with respect to a fixed member described in copending U.S. applications, Ser. Nos. 493,336 and 630,432 comprises an internal counter having digital contents which are converted into analog form. The analog values are continuously compared with an analog quantity representing the existing position of the movable member in order to supply an error signal which controls the transmission of counting pulses to the internal counter. The latter is adapted to selectively operate at different counting speeds, depending upon the speed of the movable member.

The analog comparison and generation of the error signal are effected by a cyclic position detector and the internal counter is adapted to supply a digital reading of the existing position of the movable member within the limits of each cycle of the position detector. The digital position measuring device also comprises an external counter controlled by the same counting pulses transmitted to the internal counter and having a number of decade stages which is greater than that of the internal counter. It is thereby also adapted to add up the counting cycles of the internal counter.

Therefore, due to the structure of the position detector, which operates in relation to a plurality of zero positions that are successively and equally displaced to form steps, the internal counter supplies a digital position reading relative to one of the zero positions. The external counter is provided with means for zero reset or modification of its digital contents independently of the internal counter. The external counter is therefore adapted to furnish a digital reading of position with respect to the absolute zero position or another arbitrarily chosen zero position of the machine.

In ordinary uses (for example, for checking the dimensions of a part or for positioning the movable member of a machine in predetermined positions), it is generally necessary to check the values of the coordinates along more than one axis. Digital position measuring devices of the type described in said applications are therefore employed (one for each displacement axis of the machine) which are provided with a single display device enabling the contents of the external counter to be read, so as not to overly complicate the panels used for reading the digital indications and, above all, so as not to increase the total cost of the equipment.

As explained in said applications, if it is desired to relate the readings given by the external counter (and therefore by the display device) to the absolute zero position of the machine, the movable member is brought initially to the absolute zero position. This is recognized because the digital position measuring device is furnished with means adapted to detect the alignment of the movable member with the absolute zero reference position. Under these conditions, the external counter is reset to zero. If movement of the movable member is thereafter initiated, the digital readings supplied by the display device identifies the absolute coordinates of each position reached by the movable member. By a similar method, it is possible to choose some other zero position of the machine from which the coordinates of the individual positions reached by the movable member are measured.

In some cases, however, it is also desired to know the relative position of the movable member within the limits of a step of the position detector; that is, the contents of the internal counter. In the digital position measuring device described in said applications, it is possible to obtain this value by means of a subtraction operation carried out by the operator.

As shown in FIG. 1, ZA is the absolute zero position for the movements of the movable member along the X-axis. R0, R1, R2—R7 are the zero positions which identify the beginning of successive steps $p1$, $p2$—$p7$, respectively, of the position detector. Seven zero positions and steps are shown only for illustrative purposes; their number can be selected as desired. It is assumed that the steps are of equal length $p$. The distance $\Delta$ is the distance between the absolute zero position ZA and R0, the beginning of the step immediately following. It is known since $\Delta$ is a constructional datum of the machine. P is the existing position of the movable member with $XP$ and $xP$ being the absolute and relative coordinates, respectively, of position P. The coordinates $XP$ and $xP$ are measured respectively with reference to origins ZA and R6, the latter being the beginning of step $p7$ within which position P is located. The following equations therefore apply:

$$XP = n \cdot p + \Delta + xP \quad (1)$$

$$xP = XP - (\Delta + an \cdot p) \quad (2)$$

in which $n$ represents the number of complete steps between positions R0 and P.

Referring to equation (2), the operator transcribes the digital reading of display device $XP$ and then subtracts the quantity $(6p + \Delta)$ which is equal to the distance between the absolute zero position ZA of the machine and the relative zero position R6 that comprises the beginning of step $p7$ within which position P of the movable member is located. The quantity to be subtracted is a datum which can be easily deduced by the operator. In fact $\Delta$ and $p$ are known, and $n$ can be determined by counting the number of complete steps between R0 and P on the position measuring device.

These operations, however, require time and preparation by the operator. Moreover, in digital position measuring devices, it is necessary to be able to reconstruct the reading of a position when it has been lost through current drops or because the equipment has been kept out of operation for a certain period of time without the movable member having undergone movement.

SUMMARY OF THE INVENTION

These and other defects of prior art devices are solved by the digital position measuring device according to the invention. There is provided a digital position measuring device for measuring the displacement of a member movable with respect to a fixed member along an axis provided with a series of zero position successively and uniformly displaced from each other to form steps.

A first counter and means for converting its digital contents, representing the relative position of the movable member within each of the steps, into an analog signal are provided. A position detector responsive to the analog signal and to the existing position of the movable member supplies an error signal which controls the transmission of counting pulses to the first counter and, at the same time, to a second counter. The latter is adapted to count concurrently with the first counter and is connected to a device for displaying its digital contents.

Zero reset means are used to maintain the digital contents of the first and second counters at zero count such that subsequent operation of the two counters produces a representation of the relative position of the movable member within the limits of one of the said steps in visual digital form by the display device.

DETAILED DESCRIPTION OF THE INVENTION

Figure 2:
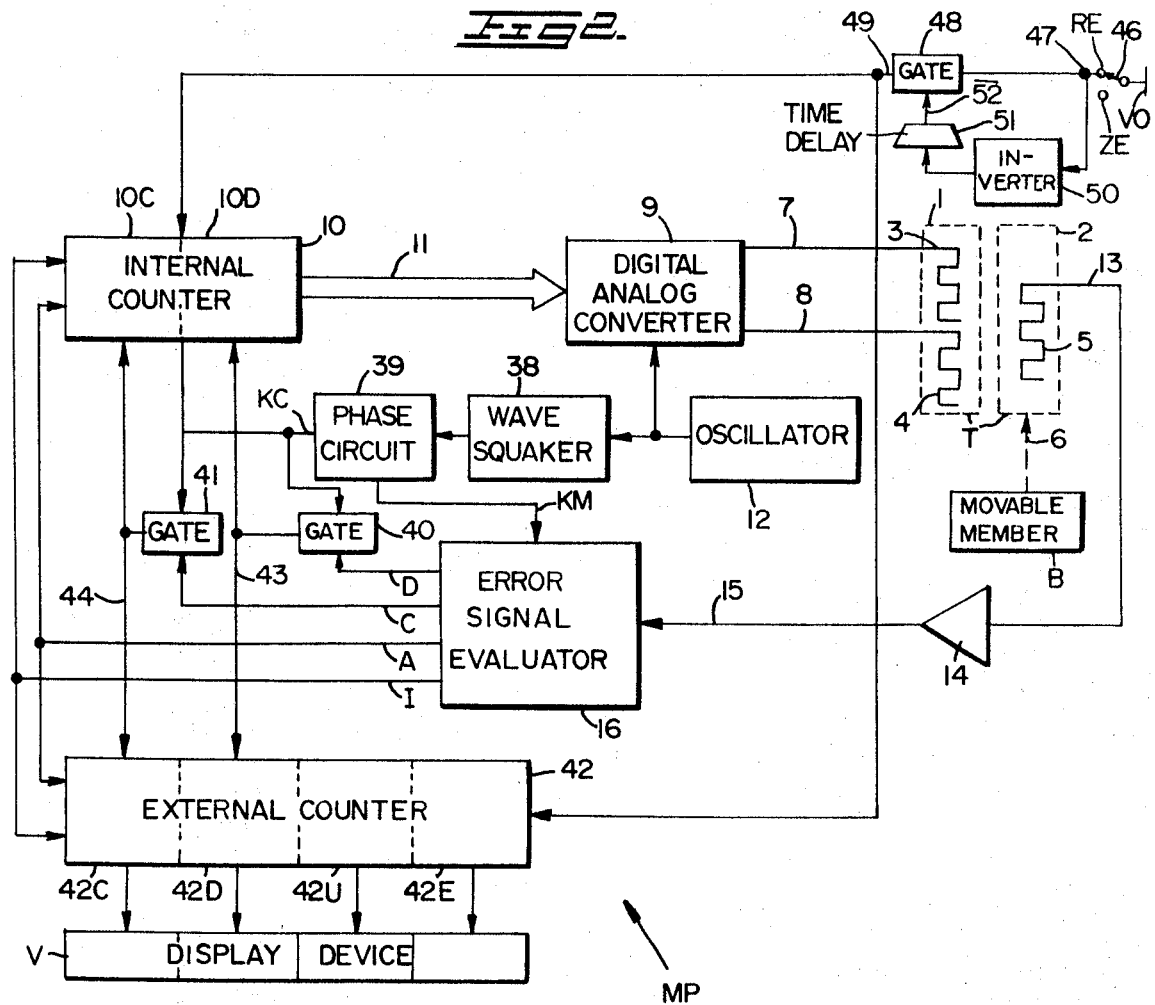
FIG. 2 is a block diagram of the digital position measuring device according to the invention.

FIG. 2 is a block diagram of the circuit of the digital position measuring device MP according to the invention. Some features of device MP are described in the above-mentioned applications and a number of modifications are shown in FIG. 2 to achieve the objects of the present invention.

Summarizing those features of device MP described in said applications, an internal counter 10 stores the $xP$ value in two cascaded decade stages 10C and 10D. The digital value on line 11 is converted to a periodic analog signal by digital-analog converter 9 which is responsive to 10kHz. oscillator 12. The analog output applied to lines 7 and 8 is fed to windings 3 and 4 of fixed part 1 of position detector T. Movable part 2 of detector T is connected at point 6 to movable member B Winding 5 of movable part 2 applies an error signal to line 13 which is amplified by amplifier 14 and fed by line 15 to error signal evaluator 16.

Oscillator 12 supplies wave-squarer 38 and phase circuit 39. The latter produces out of phase clock pulses KM and KC. Error signal evaluator 16 is enabled by pulses KM and, during each cycle, determines the polarity and magnitude of the error signal. Depending upon the polarity of the error signal, a corresponding signal is applied to one or the other of channels A and I to cause internal counter 10 and external counter 42 to correspondingly count either forward or backward. External counter 42 comprises four cascaded decade stages 42C, 42D, 42U and 42E. If the error signal is below a predetermined threshold value, a signal is applied to channel C which opens gate 41 and causes counting pulses KC to be applied to the least significant decade stages of the counters, 10C and 42C. If the error signal is above the predetermined threshold, a signal is applied to channel D to open gate 40 and cause counting pulses KC to be applied to the next most significant decade stages of the counters, 10D and 42D.

The following modifications relative to the device described in said applications make it possible to obtain a measurement of the position of movable member B relative to a step of position detector T. That is, referring to the example shown in FIG. 1 in which it is assumed that P represents the existing or actual position of movable member B along displacement axis X, the value of relative coordinate $xP$ is measured with respect to zero position R6 which represents the beginning of step $p7$ within which position P is located. This measurement is possible when movable member B is stationary at any position whatsoever along the relative axis of displacement.

FIG. 2 further shows conventional display device V having a number of reading positions equal to the number of decade stages provided by external counter 42. In the example of FIG. 2, there are four reading positions corresponding to, and directly controlled by, the four decade stages 42C, 42D, 42U and 42E, respectively. Each of the four reading positions is adapted to provide a visual representation of the decimal digit contained in the corresponding decade stage of external counter 42.

Manually operable selector switch 46 has two positions, RE and ZE. In position RE, switch 46 connects decade stages 10C and 10D of internal counter 10, and decade stages 42C, 42D, 42U and 42E of external counter 42, by conductor 49, gate 48 and conductor 47 to constant voltage source VO. This provides for zero reset of the digital contents of counters 10 and 42. When switch 46 is actuated to position ZE, constant voltage source VO is disconnected from counters 10 and 42. The signal applied to conductor 47 from constant voltage source VO is also applied to inverter 50 to produce inverted signal 52 which is applied to gate 48 to activate the latter. Delay element 51 provides a delay time that is slightly greater than the transient switching-on period of the equipment, during which the system is brought to the working state. Inverted signal 52 is removed from gate 48 when the equipment is in the working state.

Selector switch 46 is ganged to the on-off switch for the electrical supply to the equipment (not shown in the drawing). Position ZE of switch 46 corresponds to the electrical supply "off" and position RE corresponds to the electrical supply "on."

When position measuring device MP is inverted switch 46 is actuated to position RE and, since inverted signal 52 is applied to gate 48 to activate the latter, counters 10 and 42 are connected to constant voltage source VO to obtain zero reset. This condition lasts throughout the transient switching-on period of the equipment, after which inverted signal 52 is removed and zero adjustment of the two counters is terminated.

If movable member B is not located at one of the zero positions of position detector T, an error signal is produced at the output of detector T which controls the count of counters 10 and 42 through error signal evaluator 16 in such manner as to produce a gradual cancellation of the error. The state of equilibrium is reached when the digital contents of internal counter 10 are equal to the position of movable member B within a step of detector T. In this state external counter 42 has a digital content equal to that of internal counter 10 because of the identical starting states of the two counters. Position measuring device MP is then in the normal operating condition.

Since, as described in said applications, external counter 42 is provided with means for modifying its contents in count magnitude and polarity, it is possible at this point to modify the contents of counter 42 by introducing the value $XP$ or any other preselected starting value before proceeding with the subsequent measurements.

If it is desired to display the reading of absolute coordinate $XP$ on display device V, the operator will utilize equation (1), in which $\Delta$ and $p$ are known construction datum values, $xP$ is found by operations previously described, and $n$ is read on a graduated scale rigidly connected to fixed member 1. The means described in said applications can then be used to enter the digital contents and polarity in external counter 42.

Figure 1:
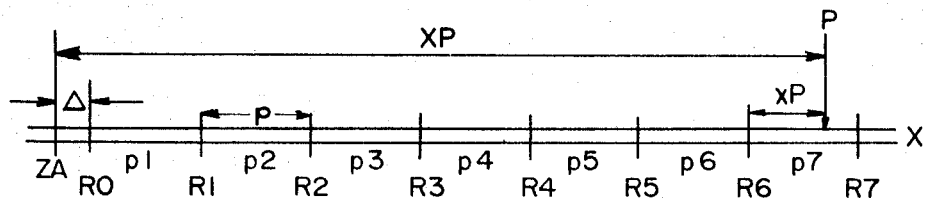
FIG. 1 shows the arrangement of the zero positions along a displacement axis of the digital position measuring device according to the invention.

Assume, on the other hand, that position measuring device MP is energized and has carried out successive measurements which have been added by the counter 42. Further, let movable member B of digital position measuring device MP be stationary in given position P (FIG. 1). Movable member 2 of position detector T, which is connected to movable member B through mechanical connection 6, is also consequently stationary. The servosystem is thus in a state of equilibrium in which internal counter 10 has a a digital content representing the current position of movable member 2 with respect to zero position R6 of fixed member 1. On the other hand, external counter 42 will generally have a different digital content.

If it is desired to obtain a visual digital reading of the position of movable member B within the limits of a step of position detector T, it will be necessary to erase the contents of external counter 42 and then transfer to it the contents of internal counter 10. A visual representation will thereby be obtained by means of display device V.

In order to achieve this result, it is sufficient to deenergize the equipment for an instant. That is, selector switch 46 is activated to position ZE. The equipment supply is then reactivated by actuating switch 46 back to position RE.

Referring to FIG. 1, if P represents the position of movable member B within step $p7$ of position detector T, the initial zero reset of counters 10 and 42 brings counter 10 to a digital state which represents, without distinction, position zero R6 or position zero R7. When the loop of the servosystem is reclosed, counter 10 begins to count until it reaches the equilibrium value corresponding to $xP$.

As explained in said applications referred to in the prior art section, internal counter 10 can count forward or backward and its counting is therefore effected so as to reach the value $xP$ by the shortest route and therefore within the shortest time. Consequently, the counting starts from that one of the two zero positions R6 and R7 which is closest to position P. If the counting proceeds from R6 towards P, that is, progressively, error signal evaluator 16 activates the forward counting channel A. If the counting proceeds from R7 to P, that is, regressively from the maximum value that the counter can count, error signal evaluator 16 activates the backward counting channel I.

External counter 42 can operate in an identical manner to internal counter 10. If, however, as disclosed in said applications, it is desired that external counter 42 be provided with means for entering the count and its polarity (plus or minus), it will be convenient, when the counter starts counting from zero and the error signal evaluator produce a regressive (backward) counting process, that the counter function as a progressive counter with a negative polarity. Consequently, if backward counting conditions exist, when equilibrium has been reached in the servosystem loop, external counter 42 will count a negative value equal to the complement of the value contained in internal counter 10. Thus, referring to FIG. 1 and under the aforesaid conditions of equilibrium, internal counter 10 will count a value representing the relative coordinate $xP$, while external counter 42 will count a value equal to $-(p-xP)$. In this case, a trained operator reading this last value on display device V will immediately be able to deduce the value of the relative coordinate $xP$.

Suitable means (not shown) are also provided for preventing (in the case of measurement of a position P located exactly at the center of a step) internal counter 10, after initial zero reset, from having to remain blocked in this state which, while providing a zero error at output 13 of position detector T, does not represent the value of the relative coordinate $xP$.

What we claim is:

1. A digital position measuring device for measuring the displacement of a member movable relative to a fixed member along an axis having a series of zero positions thereon successively and equally displaced one from the other therealong to form a series of steps corresponding to said zero positions, comprising:

first digital counter means for digitally registering the relative position of said movable member within one of said steps, said first counter means having a maximum count of a value equal to a value corresponding to the displacement along said axis between an adjoining pair of said zero positions, converter means for converting the digital content of said first digital counter into a corresponding analog signal, second digital counter means for counting concurrently with said first digital counter means, said second counter means having a maximum count of a value at least equal to the value corresponding to the displacement between three adjoining ones of said zero positions, visual display means connected to said second counter means for displaying the digital contents of the second counter means, a source of counting pulses, position detecter means responsive to said analog signal from said converter means to supply a corresponding error signal, control means operative in response to said error signal for controlling the transmission of counting pulses to said first digital counter and concurrently to said second digital counter, and zero reset means for maintaining the digital contents of said first and second digital counters at a zero value for the duration of a transient period which occurs when said digital position measuring device is switched on for subsequently starting the counting operation thereof to provide a representation on the visual digital display device of the relative position of the movable member within the limits of one of said steps.

2. A digital position measuring device according to claim 1 further comprising:

an on-off switch for the device operatively ganged with the zero reset means, second control means associated with the zero reset means to maintain the first and second digital counters at zero count when the switch is actuated to the on position for the duration of the transient switching on period of the device.